(12) United States Patent
Podrog (10) Patent No.: US 9,797,309 B2
(45) Date of Patent: *Oct. 24, 2017

(54) HAFNIUM TURBINE ENGINE AND METHOD OF OPERATION

(71) Applicant: David J. Podrog, Annapolis, MD (US)

(72) Inventor: David J. Podrog, Annapolis, MD (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/859,424

(22) Filed: Apr. 9, 2013

(65) Prior Publication Data

US 2014/0318132 A1 Oct. 30, 2014

(51) Int. Cl.
*F02C 1/05* (2006.01)

(52) U.S. Cl.
CPC .......... *F02C 1/05* (2013.01); *B64C 2201/048* (2013.01); *F02G 2254/90* (2013.01); *F05D 2220/76* (2013.01); *Y02E 30/00* (2013.01); *Y02T 50/678* (2013.01); *Y02T 70/5227* (2013.01)

(58) Field of Classification Search
USPC ........................................ 60/203.1, 643–681
See application file for complete search history.

(56) References Cited

U.S. PATENT DOCUMENTS

| | | | | |
|---|---|---|---|---|
| 3,083,528 | A * | 4/1963 | Brown | 60/203.1 |
| 3,206,925 | A * | 9/1965 | Schiff | 60/203.1 |
| 6,993,898 | B2 * | 2/2006 | Parkin | 60/203.1 |
| 7,523,892 | B2 | 4/2009 | Cook | |
| 2003/0000213 | A1 * | 1/2003 | Christensen et al. | 60/670 |
| 2005/0279098 | A1 * | 12/2005 | Kung et al. | 60/670 |
| 2006/0285621 | A1 | 12/2006 | Pohlman | |
| 2007/0119148 | A1 * | 5/2007 | Diaz | 60/203.1 |
| 2007/0206715 | A1 | 9/2007 | Godes | |
| 2010/0126178 | A1 * | 5/2010 | Hyde | B64D 27/24 60/767 |
| 2010/0132330 | A1 * | 6/2010 | Noppel | F01D 25/30 60/39.5 |
| 2010/0326085 | A1 * | 12/2010 | Veilleux | B64C 27/14 60/778 |
| 2011/0075788 | A1 | 3/2011 | McWhirter | |
| 2011/0122984 | A1 | 5/2011 | Godes | |
| 2011/0150167 | A1 | 6/2011 | Ahlfeld et al. | |
| 2012/0216549 | A1 * | 8/2012 | Burns | B64D 35/00 60/786 |
| 2013/0133480 | A1 * | 5/2013 | Donnelly | B60K 6/36 74/720 |
| 2013/0263597 | A1 * | 10/2013 | Chauvin | 60/644.1 |
| 2013/0300120 | A1 * | 11/2013 | Podrog | F01K 27/00 290/52 |
| 2014/0060048 | A1 * | 3/2014 | Hoos | 60/650 |

FOREIGN PATENT DOCUMENTS

FR 2758621 A1 7/1998

OTHER PUBLICATIONS

Wilson, Jim. "A new mini-reactor revives the dream of a nuclear-powered aircraft", Popular Mechanics, vol. 181, No. 5, ISSN 0032-4558, pp. 98-103, May 2004.*

* cited by examiner

*Primary Examiner* — Laert Dounis
(74) *Attorney, Agent, or Firm* — Jonathan Brown (57) ABSTRACT

A device powered by a method of heating a gas by directing X-rays at a mass of hafnium 178 to induce gamma rays. The gamma rays are directed at a heat exchanging apparatus, resulting in a stream of heated gas. This process powers a Hafnium gas turbine engine capable of providing shaft power or thrust to mechanical devices.

15 Claims, 11 Drawing Sheets

HAFNIUM TURBINE ENGINE AND METHOD OF OPERATION

CROSS-REFERENCE TO RELATED APPLICATIONS

This application is a divisional application of U.S. patent application Ser. No. 13/466,125 filed May 8, 2012.

BACKGROUND OF THE INVENTION

1. Field of the Invention

The present invention is directed to a method of producing shaft power or thrust, for a gas turbine engine, and more particularly, to a method of doing so by heating a gas such as air with gamma rays generated from an appropriate amount of hafnium.

2. Description of the Prior Art

There are a number of well-known methods of creating power, both electrical and mechanical, for uses such as supplying electricity to customers or powering transportation devices. For example, a combustion engine can be used to supply power to a shaft for mechanical power, such as, for example, in cars, trucks, helicopters, propeller-driven planes and ships. Alternatively, an expanding fluid or gas, such as steam or a combustible, can be used to turn a turbine which, in turn, may be attached to a shaft.

In power plants, water expanding into steam is typically used to turn a turbine, which in turn, supplies power to a generator to create electricity. The steam can be released and the water continuously replaced, but it is common to cool the steam back to water with a heat exchanger, then re-circulate the water back into the system for re-use.

In a gas turbine, high-pressure air from a compressor or compressors is mixed with a fossil fuel and ignited. The heated air is channeled to a turbine and over the turbine blades. This can be used to create mechanical shaft power, or, if the air is forced out an exhaust nozzle, thrust for a jet aircraft or other vehicle. The gas turbine has a number of uses, including powering electrical generators, ships, aircraft, and trains. Aeroderivative gas turbines, for example, are used in electrical power generation because they can be brought online, when necessary, and shut down relatively quickly. They are also seeing an increased are in the marine industry.

These systems, particularly smaller power systems for transportation vehicles such as ships, and planes, tend to rely on the burning of fossil fuels to supply heat, with the attendant downsides of fossil fuel use, such as safety concerns from fire or explosion, the cost of large amounts of fuel, environmental concerns from leakage, emission of greenhouse gases when burned, and in transportation applications, the limited range of systems relying upon fuel combustion, and the inefficiency of carrying high weights of fuel for transport situations. This last is of particular concern in long-range transportation, as the factor that limits range is often the amount of fuel that can be carried. Furthermore, it is worth contemplating that fossil fuels are non-renewable and are rapidly being depleted.

The use of steam in transportation vehicles has even more pronounced limitations. Steam-driven engines, whatever their configuration, require the use of large amounts of water, which is bulky and weighty, and fuel to heat the water, both of which must be transported with the vehicle.

Other technologies for supplying the heat necessary for power, such as, e.g., nuclear, are sometimes used, but have somewhat limited application. For example, while nuclear power is used to power some power plants and some military submarines, safety concerns from both the possibility of an accident and loss or theft of the radioactive fuel has limited the application from going much further.

Therefore, there is a need within the power and transport arts for an engine that can supply power and drive turbines, while overcoming these disadvantages, providing heat efficiently, safely, and at lowered cost, without greenhouse emissions and with an increased transport range.

SUMMARY OF THE INVENTION

The present invention provides a hafnium turbine engine and method for operating it to drive a turbine. An x-ray machine is provided, and the X-rays from the machine are directed at a mass of Hafnium 178 ($^{178}$Hf).

After the X-rays strike the $^{178}$Hf, gamma rays are induced, resulting in the emission of gamma rays from the $^{178}$Hf. The gamma rays are directed from the $^{178}$Hf to a heat exchange apparatus. A gas that has been directed to the exchange apparatus from one or more compressors or an intake is heated and accordingly, expanded. The heated, expanded gas is channeled to a turbine, driving the turbine.

The X-ray machine can be powered from a number of power sources including, but not limited to, an AC or DC power source, solar cell, battery or generator. This source can either provide continuous power to the X-ray machine or initial power sufficient to begin driving the turbine, at which point electricity generated by the turbine via a generator may be used to take over supplying power to the X-ray machine.

The heated gas used by the engine can be any suitable gas, including air, nitrogen, oxygen or hydrogen.

The hafnium engine, further, can use additional apparatus and methods known in the art for enhancing power or efficiency. For example, an intercooler can be used to cool intake or exhaust gas and deliver the cooled gas to a compressor or, depending upon the configuration, to the heat exchange apparatus.

The hafnium turbine engine can also be set up and operated as a hybrid engine, in which a fossil fuel combustion apparatus, as known and understood within the art and used in turbines, are additionally provided, and the turbine can be driven either by heated air from the heat exchanger, from the fossil fuel combustion apparatus, or both.

The hafnium turbine engine is capable of use wherever turbines are present, such as, e.g. in the fields of power supply and transportation.

When used as part of a power plant, the turbine engine can be configured to operate in a combined cycle operation with another turbine engine such that some or all of the heated exhaust from the first turbine engine is used to assist in powering a second turbine engine.

Further, the hafnium turbine engine can be attached to a gearbox and used to drive wheels, turn a propeller, or force air through a nozzle to provide thrust power so that the turbine engine cart be used to power a large assortment of transportation vehicles, on land, sea, and in the air. The types of vehicles include, by example, jet and propeller-driven aircraft, helicopters, ships and submarines, hydroplanes, locomotives, trucks and automobiles, and tracked vehicles like bulldozers and tanks.

When the vehicle is a jet airplane, in one configuration, heated gas from the heat exchanger is directed into a chamber, where it mixes with a gas flowing from the compressor into the chamber, heating the flow and powering the turbine.

In another configuration, the heat exchanger is located within the chamber, where a fossil fuel combustion chamber would be typically located and at least a portion of the gas flow from the compressor flows through the heat exchanger to be heated and directed to the turbine.

Further, the vehicle can be a space vehicle capable of operation past the earth's atmosphere, and the engine can further be configured with a closed circuit, in which the flow of exhaust gas is cooled and directed back to the intake of a compressor or heat exchanger for recirculation and re-use.

DESCRIPTION OF SPECIFIC EMBODIMENTS

Referencing now the drawings in which like numerals reference like elements throughout the views, a hafnium turbine engine, powered by induced gamma emissions, and some preferred embodiments of that engine, are depicted.

Figure 1:
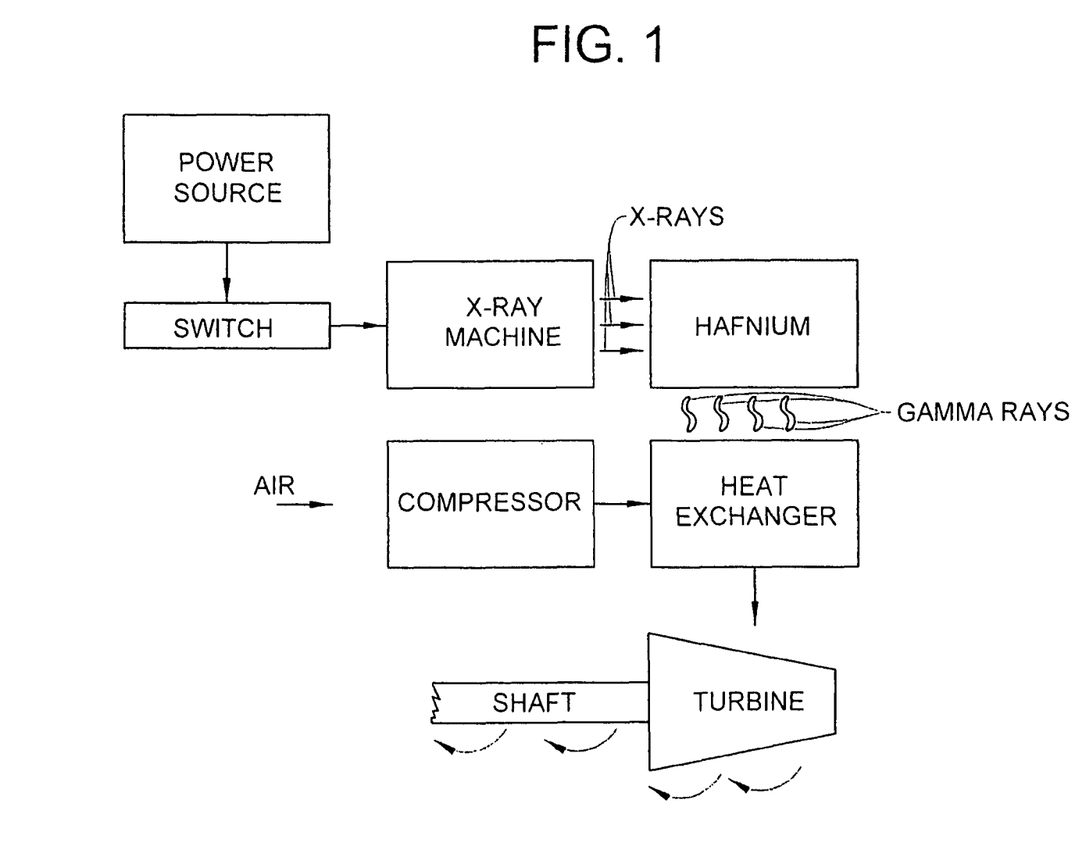
FIG. 1 is a schematic diagram showing the elements common to the various embodiments of the invention

Turning to FIG. 1, an embodiment showing the common elements of the engine is shown and will be discussed. An X-ray machine is provided, which is capable of emitting X-rays at a target. The X-ray machine can be of any suitable size or type, but in this embodiment, a monochromatic SR X-ray machine is used. The X-ray machine is directed at an appropriately-sized mass of $^{178}$Hf (atomic number 72), a silvery, metallic element. In this invention, any of the $^{178}$Hf forms or isomers may be utilized. In this particular embodiment, the 31-year isomer of $^{178}$Hf, known as $^{178}$Hf$^{m2}$, is used. When the X-ray machine is activated, generating low energy photons and electrons, the photons and electrons (X-rays) are directed onto the mass of Hafnium isomer, triggering accelerated decay of the Hafnium nuclei resulting in gamma emissions.

The Gamma rays released from the mass of Hafnium are directed to a heat exchange apparatus. A protective layer or shield (not shown), similar to known layers or shielding used to protect from microwaves or radioactive material, or other suitable layer or shielding material known in the art, can be used to shield the X-rays and Gamma rays.

The heat exchange apparatus can be any suitable heat exchange apparatus, such as a heat exchanger as in this embodiment, as known and understood within the art for facilitating the heating of a gas flowing through the heat exchange apparatus. A flow of gas from a compressor, or as in another embodiment below, from an intake, enters the heat exchanger and the induced and directed Gamma rays result in the heating of the core of the heat exchanger and the gas flowing therein. The heated gas expands and the flow is directed from the neat exchanger to a turbine to drive the turbine.

As will be shown in a further embodiment, conventional fuels may also be used in conjunction with this process in a hybrid embodiment. The heated air floods into the Gas Turbine, performing the same function as the expanding gases created by burning jet fuel, LNG or other known combustible, thereby resulting in useful mechanical work.

Figure 1A:
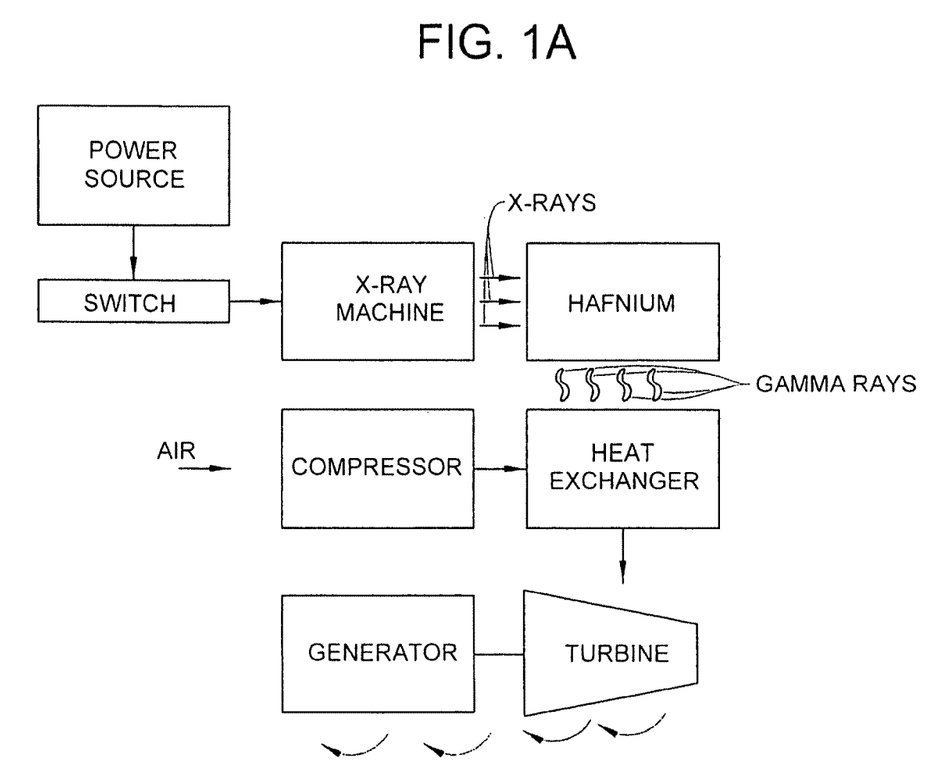
FIG. 1A is a schematic diagram of an embodiment of the invention

The useful mechanical work that can be performed by the invention are as known and understood within the art such as, e.g, mechanically driving a shaft, through a gearbox or other mechanical arrangement, or, as shown in the embodiment of FIG. 1A, turning a generator, either creating electrical power as an end, such as in a power plant, or to create electrical power to power other devices, such as some vehicles to be discussed later herein. It is to be understood that both turbines and generators are well known to those of ordinary skill in the art and need not be elaborated.

The term "heated gas" is to be understood to mean a gas that has been heated to a temperature raised enough to create a heated flow sufficient to drive any given gas turbine, as known and understood within the art. The gas can be any suitable gas for heating and expansion, including, but not limited to, nitrogen, oxygen or hydrogen. In this embodiment and the other embodiments herein, the gas will simply be air and be referred to as such.

Turning back to the X-ray machine, it can be powered continuously by any suitable means known in the art, including, but not limited to, current from an AC or DC power source, a solar cell, battery or generator attached to the X-ray machine. Alternatively, the X-ray machine may be initially activated, by such means, but once the turbine and a generator attached to it are running. The X-ray machine can be switched over and continuously powered after that from the turbine generator, with the initial power source deactivated.

Figure 2:
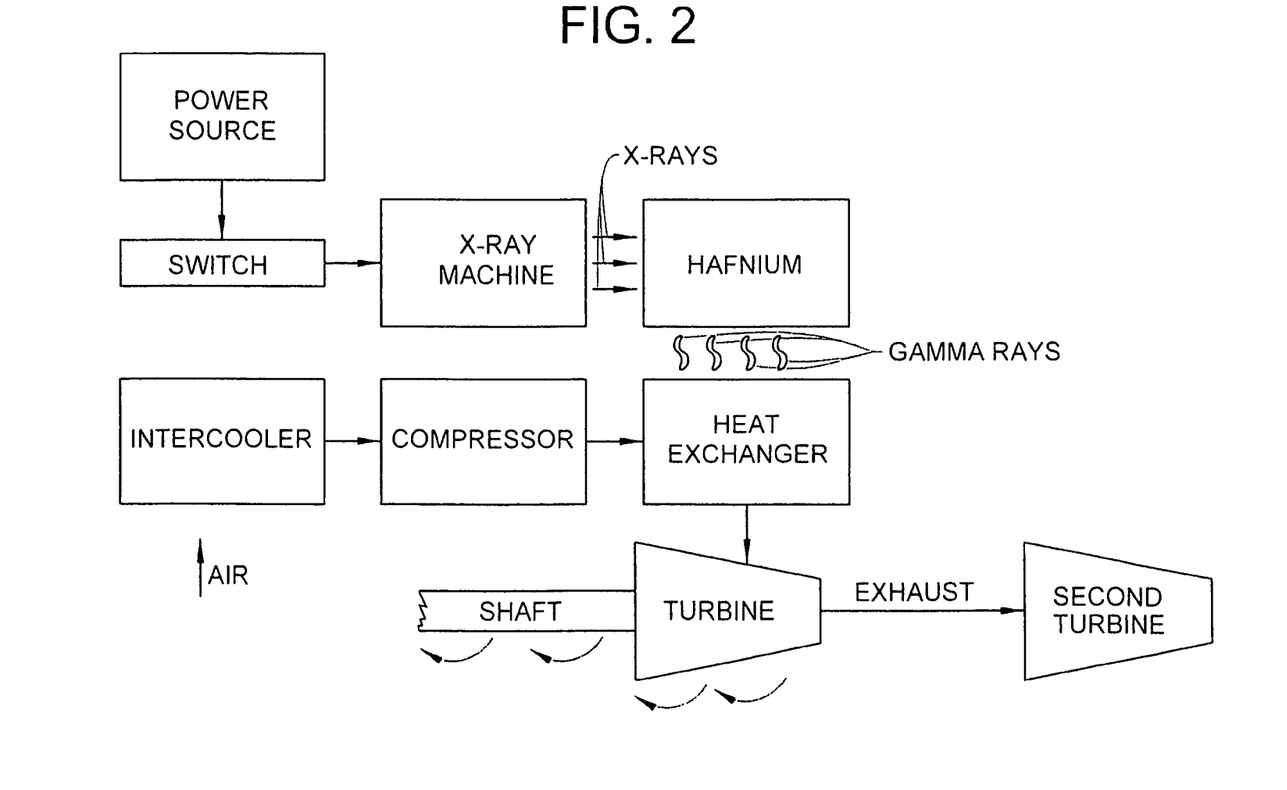
FIG. 2 is a schematic diagram of another embodiment of the invention

Turning to FIG. 2, additional equipment and designs known in the art for improving the efficiency or power of gas turbines can be incorporated with the invention herein as well. For example, an intercooler for lowering the temperature and thereby, volume, of the gas before it is heated and expanded by the heat exchanger, to provide for a greater expansion, can be attached to the apparatus at a suitable point such as immediately before the compressor, as in this embodiment, or compressors.

When an additional turbine engine, a hafnium turbine engine or standard combustion turbine engine, is provided, then the initial and additional turbine engine can be configured so that they operate in is combined cycle, as known in the art, in which at least a portion of the heated exhaust from one turbine engine is directed towards the second turbine to assist in driving it. This can increase the overall operating efficiency in settings where multiple turbines may be employed, such as in a power plant.

Figure 2A:
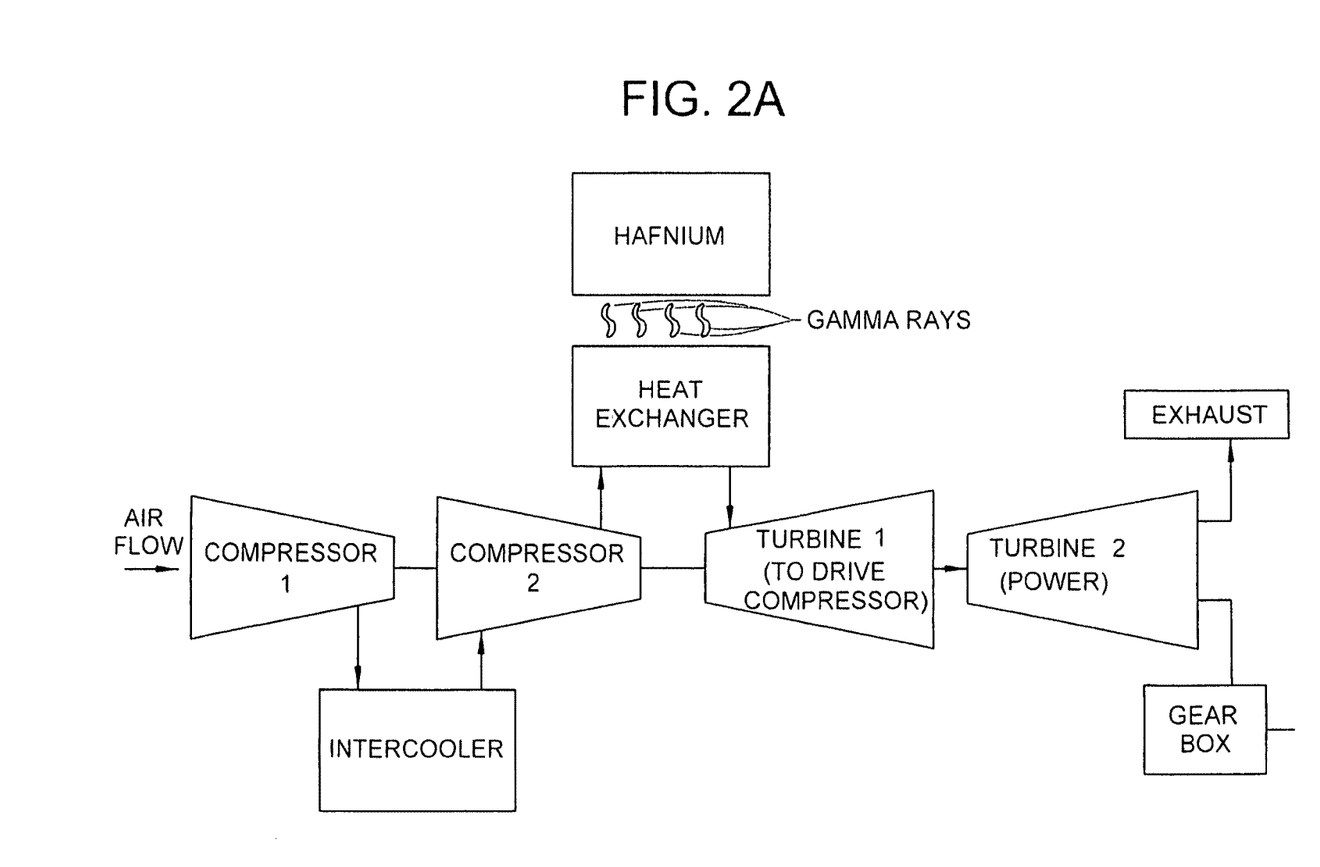
FIG. 2A is a schematic diagram of another embodiment of the invention

Turning to FIG. 2A, yet another embodiment is shown to further illustrate possible alternative combinations of features that can be configured for the invention. After the air moves through a first compressor, a second compressor is present to further compress the air. After the heat exchange apparatus heats and expands the air, it moves through a pair of turbines, which in this embodiment are a high-pressure turbine followed by a low-pressure turbines, both to provide power back to the compressors and to create power for any suitable work. In this embodiment, the second turbine is mechanically attached to a gearbox, and performs the work of driving the gearbox.

Figure 3:
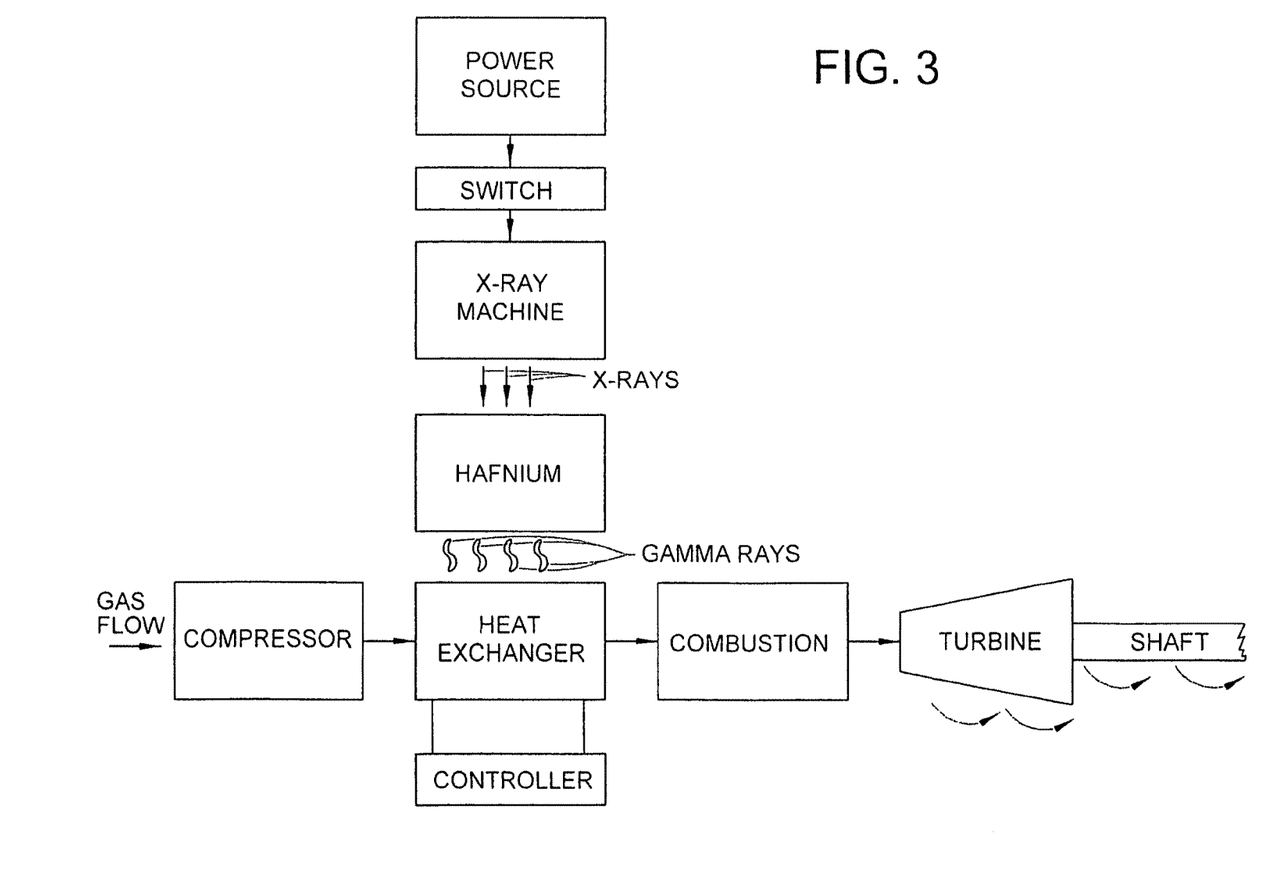
FIG. 3 is a schematic diagram of yet another embodiment of the invention relating to a hybrid engine.

Turning to FIG. 3, a hybrid configuration, which may be particularly advantageous to vehicles needing enhanced initial speed combined with long-range capability, is shown. In this embodiment, in addition to the hafnium-related apparatus, standard gas turbine combustion apparatus such as a burner(s), as known and practiced within the art and capable of driving the turbine, is provided. Both the heat exchange apparatus and the combustion apparatus are located between the compressor and turbine, and as the air exits the compressor, it flows past both. A controller unit that is capable of selecting and turning on either apparatus or both is provided. If one is apparatus turned on and the other off, the air will be heated as it moves past one of either the activated heat exchanger or combustion apparatus, and simply flow through the other. Alternatively, both can be activated by the controller, and the air heated by both as it flows past.

Figure 3A:
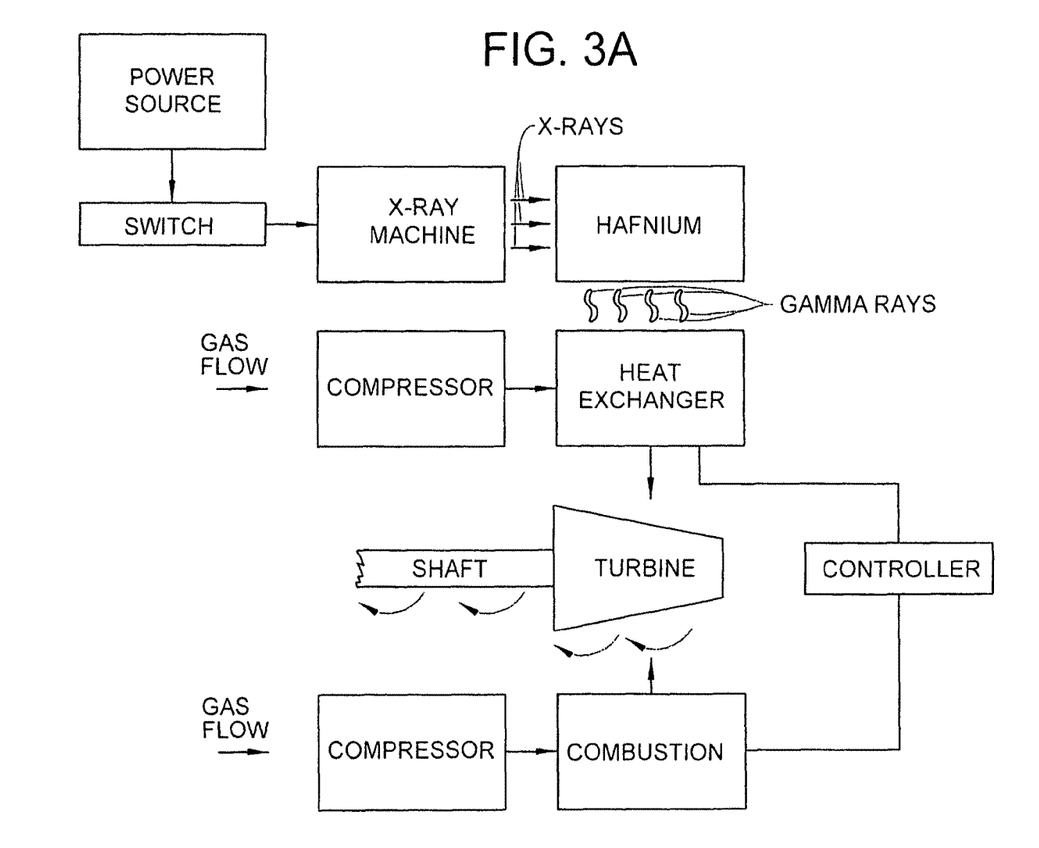
FIG. 3A is a schematic diagram of a further embodiment of the invention relating to a hybrid engine.
Figure 3B:
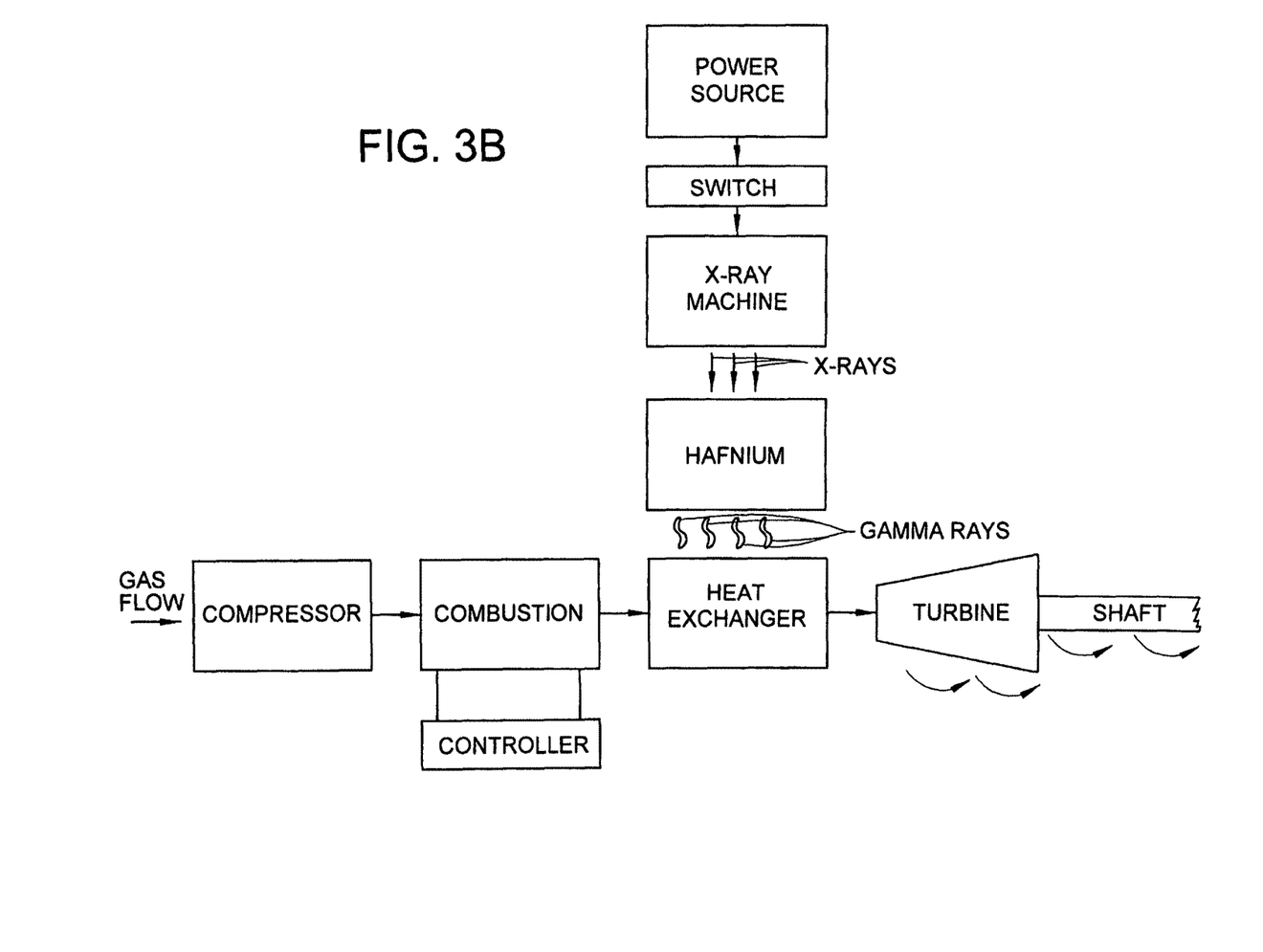
FIG. 3B is a schematic diagram of a further embodiment of the invention relating to a hybrid engine.

Turning briefly to FIG. 3b, the position of the heat exchange apparatus and the combustion apparatus can be reversed with each other from their relative positions in FIG. 3, or otherwise changed as appropriate.

Turning quickly to FIG. 3A, an alternative hybrid embodiment is shown, wherein the heat exchanger and combustion means are, respectively, linked to separate respective compressor(s), A controller is provided and either of these sets of apparatus can be set to operate with the turbine. When the controller is activated, the apparatus before the turbine is shifted away and the other apparatus placed before it. In another embodiment, the location of the turbine, rather than the other apparatus, is changeable instead, such that it can be shifted to work with either heating configuration.

Returning to FIGS. 1, and 2A, the hafnium turbine engine can be used to power any number of vehicles, specifically any vehicles that are, or could be, powered using a turbine. In this regard, a number of examples will be discussed. The turbine, as with combustion turbine engines, can be mechanically linked to a shaft, to a gearbox (as in the embodiment of FIG. 2A), to a propeller or set of wheels to drive a vehicle. The hafnium turbine can either provide direct mechanical power or be attached to an electric generator to generate electric power to operate the vehicle. Because the engine can generate large amounts of power from a relatively small amount of Hafnium, one of the advantages of using such an engine to power a vehicle is a dramatic increase in operational range for the vehicle.

In one embodiment, the vehicle is a propeller-driven airplane, the airplane comprised of at least one propeller, shaft, engine, and fuselage with tail section and wings, in which the turbine, directly or indirectly attached to the fuselage, acts to turn the shaft and propeller(s) of the airplane. In another embodiment, the vehicle is a helicopter, comprised of a body, an engine, and at least a pair of rotors, wherein the turbine, directly or indirectly attached to the body of the helicopter, provides power to turn the rotors.

In another embodiment, the vehicle is a ship, comprised of a hull, engine, shaft and at least one propeller, in which the turbine, directly or indirectly attached to the hull, drives the shaft and propeller, thereby powering the hull through the water. The shaft can be mechanically powered and turned, either through an attached gearbox or by other mechanical arrangement, or by powering an electric generator, providing electrical power to electric motor(s) which, in turn power the shaft and propeller. In yet another embodiment, the vehicle is a submarine, also comprised of a hull, engine, shaft and at least one propeller, wherein the turbine, directly or indirectly attached to the hull, drives a shaft, through a gearbox or by other mechanical arrangement, or with an electrical generator providing sufficient power to electric motor(s), to power the propeller and shaft, thereby powering the hull through the water. In another embodiment, the vehicle is a hydroplane, and is similarly powered with the turbine engine.

In another embodiment, the vehicle is a locomotive, comprised of a body, engine, drive shaft, and sets of wheels mechanically linked to the drive shaft, in which the turbine, directly or indirectly attached to the body, drives a gearbox or other mechanical arrangement, or an electrical generator that provides sufficient electrical power to electric motor(s), to power the drive shaft and wheels. In a further embodiment, the vehicle is a tracked vehicle, which may be any tracked vehicle such as, e.g., a tank or a bulldozer, and similarly to the locomotive, is comprised of a body, engine, and drive shaft, and a set of tracked wheels mechanically linked to the drive shaft, in which the turbine, directly or indirectly attached to the body, drives a gearbox or other mechanical arrangement, or an electrical generator that provides sufficient electrical power to electric motor(s), to power the drive shaft and tracked wheels.

Further new developments in micro-turbines have broadened the possible use of turbines, and accordingly, the hafnium turbine engine, to even smaller vehicles. Accordingly, in further embodiments, the vehicle can additionally be an automobile, or truck. The automobile or truck is comprised of an engine, body, drive shaft, and a set of wheels, mechanically linked to the drive shaft, wherein the turbine, directly or indirectly attached to the body, drives a gearbox or other mechanical arrangement, or an electrical generator that provides sufficient electrical power to electric motor(s), to power the drive shaft and wheels. Further the vehicle can be a motorcycle wherein at least one wheel is mechanically linked to at least one micro-turbine.

Figure 4:
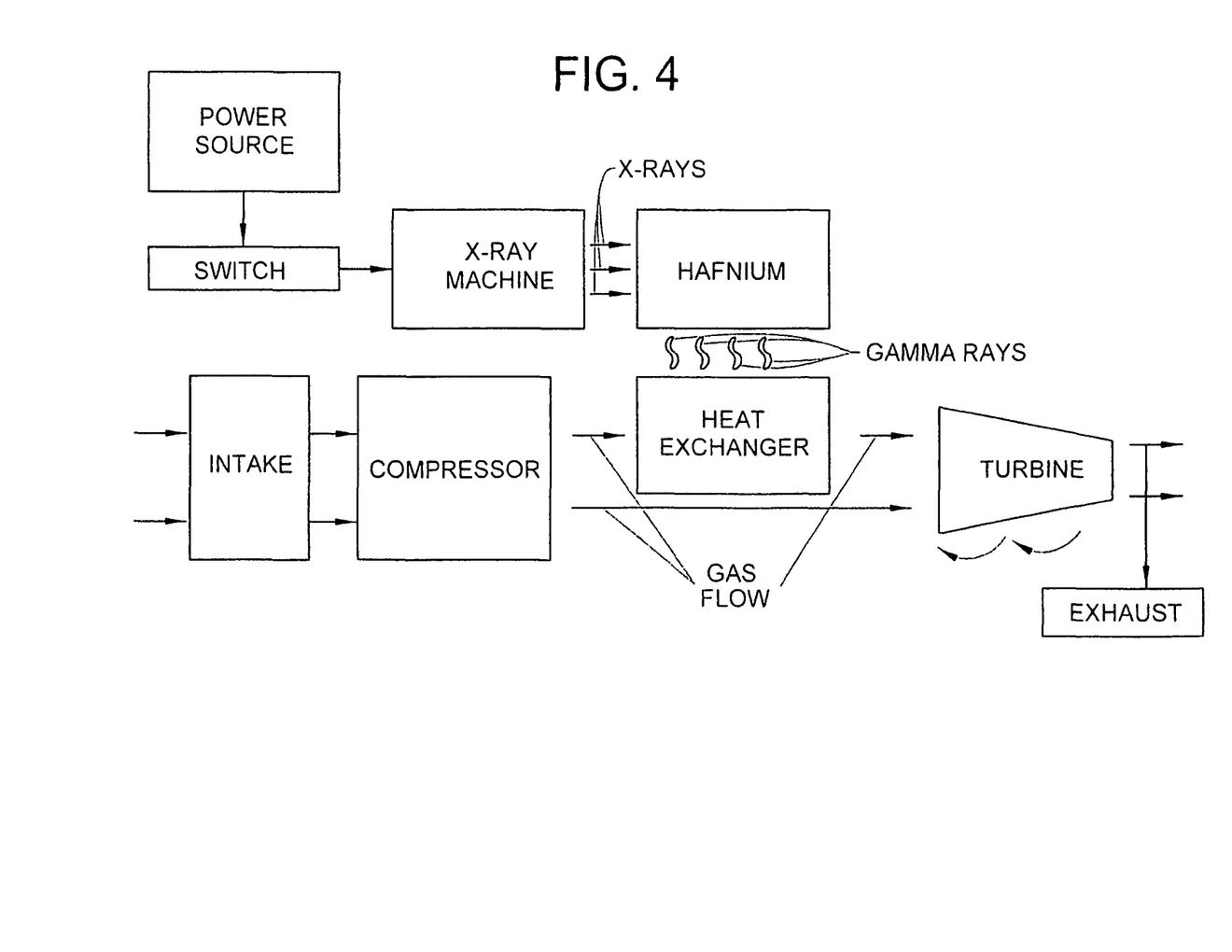
FIG. 4 is a schematic diagram of a further embodiment of the invention relating to a jet engine.
Figure 5:
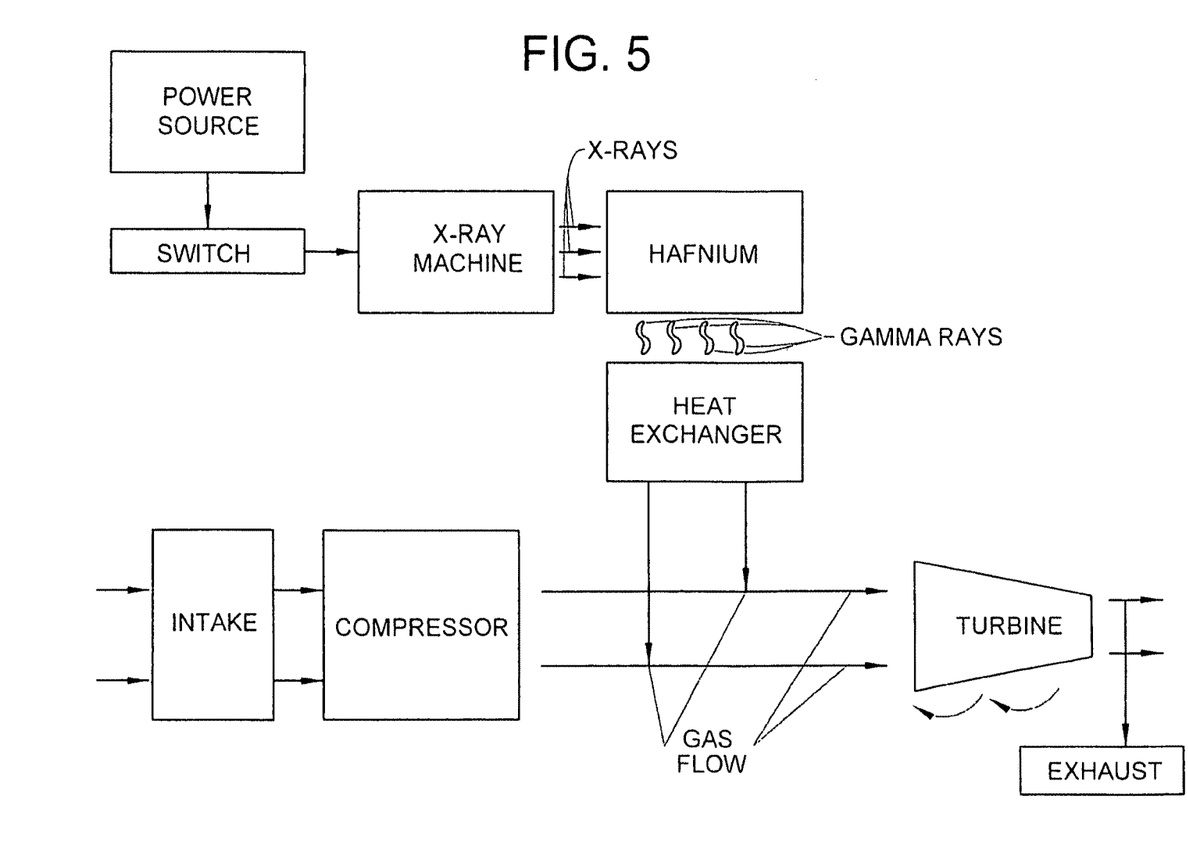
FIG. 5 is a schematic diagram of a further embodiment of the invention relating to a jet engine.

In the embodiments of FIG. 4 and FIG. 5, the vehicle is a jet aircraft, comprised of at least one, and commonly more, turbine engines, and a fuselage with attached wings and tail section. The turbine engines are comprised of an intake, compressor for compressing air, an area for heating air, a turbine, a shaft linking at least the compressor and turbine, and exhaust nozzle, wherein the intake, compressor, turbine and exhaust nozzle are directly or indirectly attached to the fuselage.

Turning to FIG. 4, an intake, compressor and turbine are provided, and an air flow is established from the intake towards the turbine. Between the compressor and turbine is provided an area, or chamber. The heat exchanger is disposed within this chamber and as the compressed air flows from the compressor, at least a portion of the compressed air goes through the heat exchanger, whereupon it is heated as it moves towards the turbine. The chamber and heat exchanger can be configured so that a portion of the air flow moves through the heat exchanger, as shown in FIG. 4, or so that all of the air flow moves through the heat exchanger. In addition, the additional Hafnium engine apparatus, such as the X-ray machine, and Hafnium, can be located within the chamber with the heat exchanger as a single integrated unit, or, as in this embodiment, located outside the chamber, with gamma rays directed inward to the heat exchanger.

A specific particularly advantageous application of the long ranges and low fuel weight of this technology would be in the area of remote-controlled, or drone, aircraft, as the requirements for these aircraft are often to travel for very long ranges, stay in the air observing a specific area for long periods of time, and return.

Turning to FIG. 5, an alternative embodiment for a jet engine is shown. This embodiment is similar to that shown if FIG. 4, except that the heat exchanger is connected to the chamber, rather than located within it. As air flows from the compressor into the chamber, heated air from the heat exchanger, mixes with the compressed air, heating it as it moves toward the turbine.

The hybrid configuration, described above and referred to FIG. 3, can also be configured with any of these embodiments for jet engines described herein. In the embodiment of FIG. 4, there would be a separate fossil fuel turbine engine, with a control unit capable of switching between it and the hafnium-powered engine.

In the embodiment of FIG. 5, there can be a standard fossil fuel combustion chamber, and the heat exchanger connected to the chamber Gas could be heated either within the chamber by fossil fuel combustion, or heated by the heat exchanger and added to the chamber as described above, or if appropriate, both. Whichever method is employed, such hybrid arrangements could be particularly advantageous in the context of jet aircraft, in that standard fossil fuel combustion could be used for takeoffs and landings, wherein the more instantaneous extra power offered by fossil fuels, would be available. The engine(s) could be switched to/from the hafnium power during the cruising portion of the flight, taking advantage of the extra flight range of hafnium power, thereby obtaining an advantage of both methods in a single apparatus.

Figure 6:
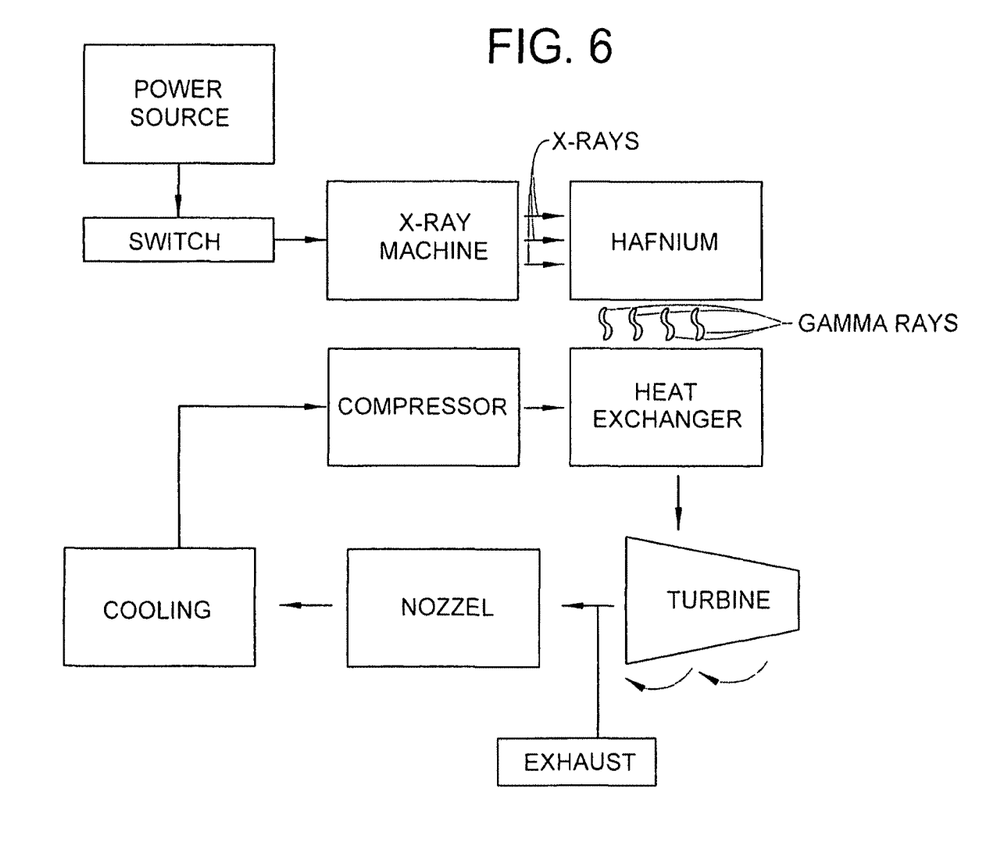
FIG. 6 is a schematic diagram of a further embodiment of the invention.

Turning to FIG. 6, another embodiment is shown for a closed system. In this embodiment, and similarly to the jet engines of previous embodiments, the exhaust from the turbine provides thrust for a craft via a nozzle. After the air is exhausted, however, cooling means, such as a second heat exchanger, cool the air, thereby condensing and recapturing it. The cooled air is recirculated back to the first heat exchanger or, as in this embodiment, compressor, depending upon the particular configuration of the system, to be used in a continuous closed-loop cycle. The recirculation of the air, and in particular the circular flow amongst the compressor and turbine, is emphasized in FIG. 6A.

Figure 6A:
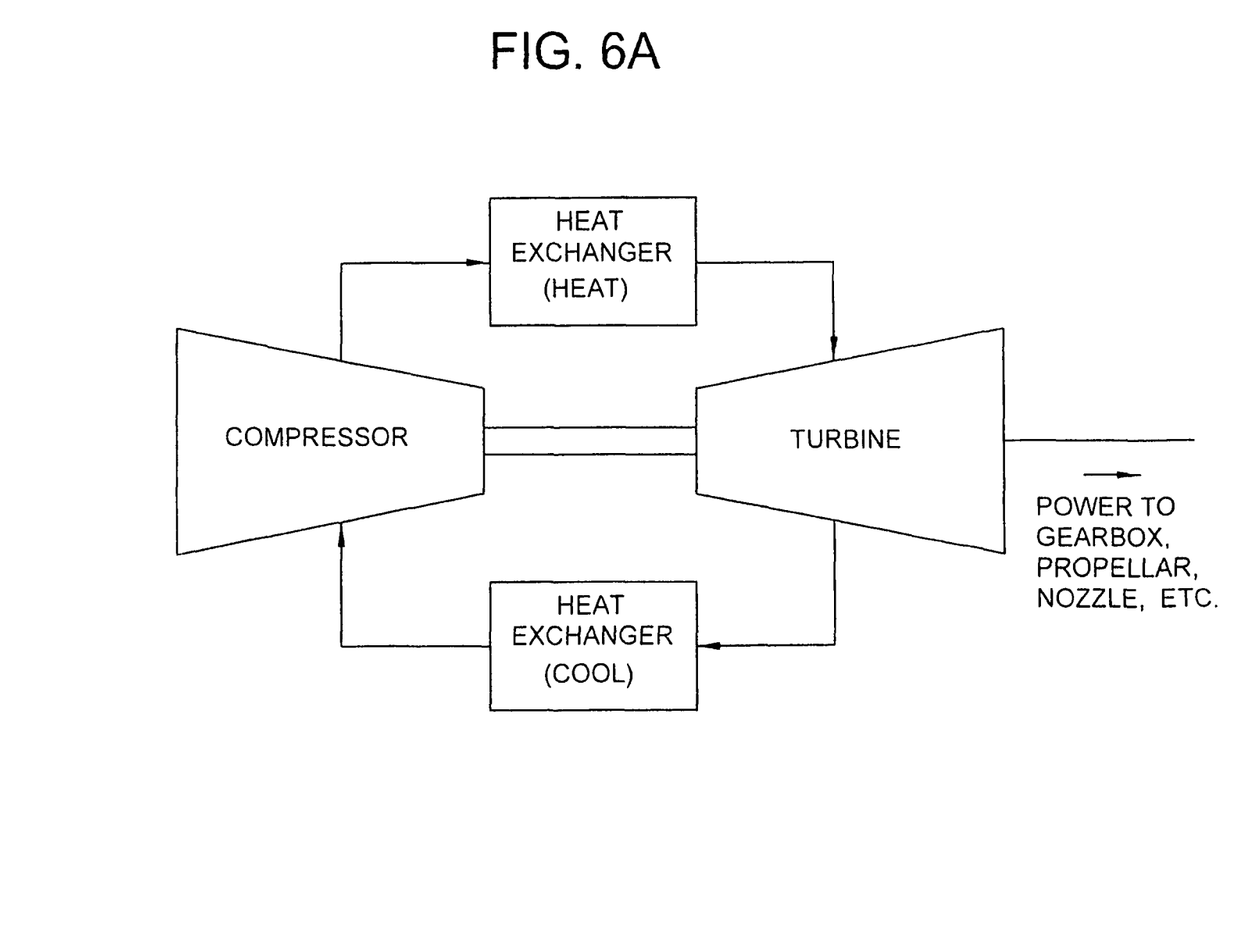
FIG. 6A is a schematic diagram emphasizing specific features of the embodiment of FIG. 6.

Looking to both FIGS. 6 and 6A, this embodiment can be used with other vehicles or purposes as may be desirable, but could be particularly useful in an embodiment wherein the vehicle is a high altitude or space vehicle. Many commercial jetliners cruise at a height of between 30,000 and 45,000 feet above mean sea level, and the earth's atmosphere is generally considered by many to end at approximately 100,000 km above the earth. Accordingly, the term "high altitude vehicle" is to be understood to mean a vehicle capable of operating at altitudes above 45,000 feet above mean sea level up to 100 km, and the term "space vehicle" is to be understood to mean a vehicle capable of operation outside of 100 km above the earth.

While various aspects and embodiments of the invention, have been described above, other aspects and embodiments will be apparent to those skilled in the art. The above description art for purposes of illustration and are not intended to be, and should not be taken as, limiting the scope of the invention as defined by the following claims.

The invention claimed is:

1. A hafnium-powered vehicle comprised of a hafnium turbine engine, wherein the hafnium turbine engine is comprised of:

an X-ray machine,
a mass of hafnium $^{178}Hf^{m2}$ isomer,
at least one compressor,
a heat exchange apparatus,
and at least one gas turbine,
wherein the X-ray machine and the mass of hafnium $^{178}Hf^{m2}$ isomer, are configured to operate as a single, integrated unit such that X-rays from the X-ray machine will directly strike the mass of hafnium $^{178}Hf^{m2}$ isomer when the X-ray machine is activated,
wherein the at least one compressor is configured to direct a flow of gas from an intake of the at least one compressor, where the flow of gas originates, and direct the flow of gas through the at least one compressor towards the heat exchange apparatus,
wherein the heat exchange apparatus is a physically integrated part of the engine, and
wherein the heat exchange apparatus is configured to receive the flow of gas from the at least one compressor through the heat exchange apparatus,
and wherein the mass of hafnium $^{178}Hf^{m2}$ isomer is configured such that gamma rays from the mass of hafnium $^{178}Hf^{m2}$ isomer are capable of striking the heat exchange apparatus approximately perpendicular to the flow of gas through the heat exchange apparatus, thereby heating the gas as it flows within the heat exchange apparatus,
and wherein the heat exchange apparatus is configured to direct the flow of heated gas towards the gas turbine to drive the gas turbine.

2. The vehicle of claim 1, wherein the turbine is mechanically linked to a gearbox, shaft, or a generator.

3. The vehicle of claim 1, wherein the hafnium turbine engine is further comprised of a generator and at least one electric motor,
and wherein the turbine is mechanically linked to the generator,
and wherein the generator is configured to provide electrical power to the at least one electric motor.

4. The vehicle of claim 1, wherein the turbine is mechanically linked to two or more wheels.

5. The vehicle of claim 1, wherein the vehicle is a jet airplane.

6. The vehicle of claim 1, wherein the vehicle is a jet airplane, and is further comprised of a chamber located in proximity to the turbine,
wherein the heat exchange apparatus is located within the chamber,
and wherein the chamber is configured so that gas will flow through the chamber towards the turbine,
and wherein the chamber and heat exchange apparatus are configured so that a portion of the gas will flow through the heat exchange apparatus and a portion of the gas will flow past the heat exchange apparatus.

7. The vehicle of claim 1, wherein the hafnium turbine engine is further comprised of a combustion chamber, and
wherein the heat exchange apparatus is located either between the compressor and the combustion chamber or between the combustion chamber and the turbine, and further comprising a controller unit capable of activating the combustion chamber, the heat exchange apparatus, or both.

8. The vehicle of claim 1, wherein the vehicle is a propeller-driven airplane.

9. The vehicle of claim 1, wherein the vehicle is a helicopter.

10. The vehicle of claim 1, wherein the vehicle is a ship.

11. The vehicle of claim 1, wherein the vehicle is a submarine.

12. The vehicle of claim 1, wherein the vehicle is a locomotive.

13. The vehicle of claim 1, wherein the vehicle is a truck, automobile or a motorcycle.

14. The vehicle of claim 1, wherein the vehicle is a tracked vehicle.

15. The vehicle of claim 1, wherein the vehicle is a high altitude vehicle or space vehicle, and further comprises a closed circuit capable of cooling a flow of exhaust gas and directing the exhaust gas back to the intake of the at least one compressor or heat exchange apparatus for recirculation and re-use.

* * * * *